3,013,859
SEPARATION OF SCANDIUM VALUES FROM
IRON VALUES BY SOLVENT EXTRACTION
Carl William Kuhlman, Jr., Clayton, and Gerhard P. Lang, St. Louis, Mo., assignors to the United States of America as represented by the United States Atomic Energy Commission
No Drawing. Filed July 15, 1958, Ser. No. 748,770
4 Claims. (Cl. 23—22)

This invention deals with a process of recovering scandium values from solutions and particularly with the decontamination of scandium values from iron values frequently associated therewith.

Scandium-containing solutions are obtained as raffinates, for instance, in the processing of uranium-containing ores, such as pitchblende, by diethyl ether extraction of nitric acid solutions of the ores; these raffinate solutions contain, in addition to scandium, some residual non-extracted uranium, and also rare earth salts, iron and copper salts. For the recovery of the uranium and scandium the raffinates are usually subjected to a series of extraction and back-extraction steps, as will be explained in detail later. In the course of these procedures organic solutions, usually in tributyl phosphate, are obtained which contain scandium and rare earths together with iron.

The presence of such contaminants is very undesirable for most uses of scandium. Moreover, iron impairs the separation of the scandium from the rare earths by a process comprising the conversion of the scandium to the ether-extractable thiocyanate, because red-colored ferric thiocyanate then forms and colors both phases so deeply that the interface cannot be distinguished and the quantitativeness of phase separation is impaired.

It is an object of this invention to provide a process of separating scandium values from contaminants contained in a solution whereby one type of said values is quantitatively removed from said solution while said other type is completely retained therein.

It is another object of this invention to provide a process of separating scandium values from contaminants associated therewith whereby a high-purity scandium oxide is obtained.

It is also an object of this invention to provide a process of separating scandium values from contaminants whereby the scandium is recovered in a high yield.

It has been found that alkyl phosphate solutions, and particularly tributyl phosphate solutions, as they are obtained during the processing of aqueous ore raffinates derived from ether extraction, can be freed from the contaminants by scrubbing the solutions with a concentrated aqueous solution of magnesium nitrate; by this, the contaminants are back-extracted into the magnesium nitrate solution, while some rare earth values and the scandium values remain in the alkyl phosphate. Conversely, the scandium can be selectively extracted with tributyl phosphate from an aqueous solution containing the scandium values together with the contaminants provided that a high concentration of magnesium nitrate is incorporated into the aqueous solution prior to extraction.

The magnesium nitrate solution, in order to be satisfactorily effective, should be a concentrated solution, as has been just mentioned; a saturated solution yielded the very best result. Using, for instance, about 1 volume of a saturated magnesium nitrate solution for each 5 volumes of a tributyl phosphate solution, from 4 to 6 scrubs were required to remove all the iron from the tributyl phosphate. As has been mentioned before, the scandium then is nearly quantitatively held by the alkyl phosphate solution.

In order to illustrate how the process of this invention fits in the entire operation of processing an "ore raffinate" as it is obtained by the ether extraction of a nitric acid ore solution, one embodiment of the entire procedure will now be outlined broadly.

The aqueous "ore raffinate," in the embodiment to be described, is first de-etherized by heating, and then it is filtered to remove any solid particles therefrom. The specific gravity of the filtrate is then adjusted to about 1.3, and thereafter the nitric acid content is brought to a concentration of less than 0.05 M. (The nitric acid concentrations throughout this specification define the content of free acid excluding the acid formed by hydrolysis.) Thereafter the "filtrate" is contacted with undiluted, and preferably purified, tributyl phosphate; purification of the tributyl phosphate is carried out by scrubbing with a sodium carbonate solution, whereby the mono- and dibutyl phosphates are removed, followed by scrubbing with water for the removal of sodium carbonate.

In this tributyl phosphate extraction all of the uranium is removed from the "filtrate." If the uranium content is comparatively high in the "filtrate," say if it is above 5 grams per liter, the extraction of the rare earths and the scandium is inhibited; in this case it is advantageous to carry out two extraction steps with tributyl phosphate, the first one for the recovery of the uranium, and the second one for the extraction of scandium and rare earths.

The "tributyl phosphate extract phase"—or the two combined phases, as the case may be—which contains all uranium and practically all (about 95 percent) of the scandium is then scrubbed with a concentrated magnesium nitrate solution whereby coextracted contaminants, which later on would inhibit the stripping of scandium, are removed.

The "tributyl phosphate extract phase" is then diluted with ether in order to facilitate phase separation, and thereafter it is contacted several times with a small volume of water. In this stripping step an aqueous "crude strip solution" is obtained which contains all of the scandium, 20 percent of the uranium and most of the contaminants, such as iron, copper and rare earths, while the remaining "tributyl phosphate raffinate" averages a content of about 80 percent of the uranium.

The uranium is then stripped from this "tributyl phosphate raffinate" with an aqueous solution of sodium carbonate whereby the uranium is back-extracted as sodium uranyl carbonate. This stripping with the sodium carbonate at the same time also accomplishes repurification of the tributyl phosphate from any mono- and dibutyl phosphates which may have formed meanwhile by hydrolysis and which would impair the scandium extraction. The tributyl phosphate is thus regenerated for recirculation into the process. The uranium is then precipitated by adding sodium hydroxide to the sodium uranyl carbonate solution.

The "crude strip solution," which contains the remaining 20 percent of the uranium together with scandium, rare earths, and contaminants, such as iron and copper values, is evaporated to about $\frac{1}{100}$ of the volume of the ore raffinate. This solution, the "crude concentrate," is then extracted with ether, for the removal of the uranium, after magnesium nitrate has been added as a salting-out agent and the nitric acid content has been adjusted to about 2 N. The salting-out agent content should not be too high for this step in order to reduce scandium extraction to a minimum. An amount of magnesium nitrate bringing the density of the "crude concentrate" to about 1.25 was found optimum. An "aqueous ether raffinate" and an "ether phase" are obtained.

The "ether phase" then contains all of the remaining 20 percent of uranium and from about 6 to 8 percent of the scandium; it is first scrubbed with very little water so that the scandium only is back-extracted and pure uranium is obtained in the "ether raffinate." This scandium-containing scrub solution is recycled into the "crude strip solution" for recovery of the scandium. The uranium is then recovered by back-extracting it from the "ether raffinate" with a relatively large volume of water, whereby an "aqueous uranium solution" is obtained.

The "aqueous ether raffinate," which contains in addition to magnesium nitrate, the rare earths, the bulk of the scandium and of the contaminants, such as iron and copper, is then contacted with undiluted tributyl phosphate, after the nitric acid content has been adjusted to a concentration of between 0.5 and 2 M, preferably of about 1 M. The tributyl phosphate extracts most of the iron, the scandium and rare earths into a "tributyl phosphate-scandium feed solution," while the remaining part of the iron and copper values remain in the "aqueous waste solution." For further recovery this "aqueous waste solution" can be recycled into a new batch of ore raffinate.

The "tributyl phosphate-scandium feed solution" is then scrubbed with magnesium nitrate, according to this invention, whereby the iron nitrate is removed. Thereafter, the "tributyl phosphate-scandium feed solution" is stripped with water whereby the scandium and rare earths are removed from the tributyl phosphate and the tributyl phosphate is regenerated for recycling.

The aqueous strip solution containing the scandium and rare earth values, the "back-extract," is then prepared for a fractional ether extraction; for this purpose ammonium thiocyanate is added whereby scandium thiocyanate is formed. Sodium chloride was found to be a better salting-out agent for this extraction than sodium nitrate, and a saturated solution thereof yielded the best results. The acid concentration for this extraction is preferably very low, and a concentration of between 0 and 0.5 M was found best. Ether is then added to the adjusted "back-extract" whereby the scandium thiocyanate is taken up by the ether and an "organic scandium phase" is formed, while the rare earth values remain in an "aqueous rare earths phase." This extraction should be carried out as soon as possible after the ammonium thiocyanate has been added in order to avoid decomposition of the thiocyanate and reduction of extraction. The rare earths can then be precipitated from the "aqueous rare earths phase" by adding ammonia, and the hydroxides formed thereby can be converted to the oxides by ignition.

The "organic scandium phase" containing the scandium thiocyanate is thoroughly scrubbed with ammonium thiocyanate whereby yttrium, which usually is coextracted with the scandium to a substantial degree, is removed. Thereafter the "organic scandium phase" is contacted with water whereby the scandium is back-extracted. The scandium, too, is then precipitated with ammonia, and the scandium hydroxide is converted to the oxide by ignition. The scandium obtained by this procedure usually has a purity of above 99 percent, and the yield—when recycling is used—amounts to an average of between 85 and 90 percent.

In the following, two examples will be given to illustrate the process of this invention. In the experiments on which these examples are based, the scandium contents of the various solutions were determined by counting; for this purpose the radioactive isotope scandium[46] was added to the solutions in tracer concentrations before processing. The radioactivity of the solutions due to the content of active daughter products of uranium were separately counted in order to determine the background activity and to make possible calculation of the scandium content from the measured activity. All radioactive counts were made from liquid samples held in centrifuge tubes using the 1.3 mev. $\gamma$-rays associated with the scandium[46].

The detector was a straight-form glass-enveloped Geiger tube with a 1/4-inch piece of Lucite mounted between the sample and the tube to absorb any energetic $\beta$-rays which may have penetrated the sample holder. The sample and tube were shielded with 1½ inches of lead. The counter was a conventional one using a Higginbotham scale of 64.

*Example 1*

A "crude concentrate" had been obtained by the process described above from an "ore raffinate" containing, per liter, about 1 gram of uranium, about 0.04 gram of $Sc_2O_3$, 7 grams of $Fe_2O_3$, 8.7 grams of $SiO_2$, 18 grams of $Al_2O_3$, 9 grams of NiO, 7.2 grams of CoO, 42 grams of CaO, 18.3 grams of MgO, 4.6 grams of CuO, 7.7 grams of sulfur (expressed as $So_3$), and minor quantities of $MoO_3$, $Mn_2O_3$, $V_2O_5$, $Na_2O$, PbO, ZnO, and CdO.

The "crude concentrate" was diluted until it had a specific gravity of 1.24, and the nitric acid content was adjusted to 1 lb./gal.; magnesium nitrate was then added as a salting-out agent in a quantity of 2.5 lbs./gal. The "crude concentrate" thus prepared was extracted twice with diethyl ether, each time using 2 volumes of ether per 1 volume of "prepared crude concentrate." In both instances, after a thorough contact of the two liquids had been obtained by agitation, the "aqueous ether raffinate," which contained the rare earth values, scandium, iron and copper values, in addition to the magnesium nitrate, was separated from the "ether phase"; the two ether phases were combined.

The "aqueous ether raffinate" was adjusted to a nitric acid concentration of about 1 M, and it was then extracted twice with undiluted tributyl phosphate using 1 volume of tributyl phosphate for 2 volumes of "aqueous ether raffinate." In this step most of the iron, all of the scandium and practically all of the rare earth values were extracted into the tributyl phosphate to form a "tributyl phosphate-scandium feed solution," while some of the iron and all of the copper values remained in an "aqueous waste solution."

The "tributyl phosphate-scandium feed solution," after separation from the aqueous waste solution, was then scrubbed five times, according to this invention, with an aqueous magnesium nitrate solution which contained 2.5 pounds of magnesium nitrate per gallon; for each scrub 1 volume of magnesium nitrate solution was used per 5 volumes of "tributyl phosphate-scandium feed solution." After the fifth scrub no iron could be detected in the scrub solution after contact with the tributyl phosphate solution, which indicated complete removal of the iron. All scandium and rare earths had remained in the tributyl phosphate.

The iron-free "tributyl phosphate-scandium feed solution" was then treated for the separation of scandium from the rare earths. For this purpose, both scandium and rare earth values were first back-extracted by contacting the tributyl phosphate solution six times with water, each time using a volume ratio of tributyl phosphate solution:water of 5:1.

To the "back-extract" obtained by combination of the six scrubs there were then added 2.5 pounds of ammonium thiocyanate per gallon, and the mixture was then extracted with ether three times, each time using 1 volume of ether per 2 volumes of "back-extract"; the three ether phases were separated from an "aqueous rare earths phase" and combined as "organic scandium phase." The "organic scandium phase" contained practically all of the scandium thiocyanate; it was scrubbed four times, each time with 1/5 of its volume of an ammonium thiocyanate solution which contained 2.5 pounds of the salt per gallon.

The "scrubbed organic scandium phase" was then stripped by contacting it three times with water, using 1 volume of water per 5 volumes of scandium phase. Ammonia was then introduced to the "aqueous scandium phase" thus obtained whereby all of the scandium was precipitated as the hydroxide. The hydroxide was filtered off and ignited whereby it was converted to scandium oxide. The yield was 69 percent. This yield can be brought up to 80 to 90 percent by recycling the various raffinate solutions. Analysis of the scandium oxide product showed that no foreign element was present in a concentration greater than 0.01 percent with the exception of iron and copper the content of which ranged between 0.01 and 0.1 percent.

The "aqueous rare earths phase" was also treated by precipitation with ammonia, and the rare earth hydroxides were converted to the oxides by ignition. These rare earth oxides can then be separated from each other by any method known to those skilled in the art.

The next example will illustrate the effect of the iron nitrate content on the extraction of scandium.

*Example II*

Three laboratory runs were carried out using a tributyl phosphate solution containing both scandium and iron values. Aliquots of the same solution were used in all three runs, and all conditions were identical with the exception that, while run No. 1 consisted of six stripping steps using water as the stripping medium, run No. 2 comprised one scrubbing step with magnesium nitrate before stripping, and run No. 3 used two magnesium-nitrate-scrubbing steps prior to back-extraction with water. After each step the distribution coefficient ($K_D$) for scandium (scandium concentration in the organic phase: scandium concentration in the aqueous phase) was determined, and the percentages of scandium removed from the tributyl phosphate were calculated from the distribution coefficients. The results of these three runs are tabulated in the table below. A dash in this table indicates that the operation was not performed.

| Operation | Run No. 1 | | Run No. 2 | | Run No. 3 | |
|---|---|---|---|---|---|---|
| | $K_D$ | Sc Removed, Percent | $K_D$ | Sc Removed, Percent | $K_D$ | Sc Removed, Percent |
| Scrub No. 1 | — | — | ∞ | 0 | ∞ | 0 |
| Scrub No. 2 | — | — | — | — | ∞ | 0 |
| Strip No. 1 | 38 | 0.5 | 16 | 6 | 0.47 | 68 |
| Strip No. 2 | 0.73 | 20 | 2.2 | 35 | 0.26 | 94 |
| Strip No. 3 | 0.19 | 56 | 0.85 | 70 | 0.10 | 99 |
| Strip No. 4 | 0.12 | 83 | — | — | — | — |
| Strip No. 5 | 0.15 | 93 | — | — | — | — |
| Strip No. 6 | 0.20 | 97 | — | — | — | — |

The above results show that scandium stripping is considerably improved after one or two scrubs with magnesium nitrate. This is possibly due to a strong salting-out effect which the ferric nitrate has and which intensifies the scandium extraction into tributyl phosphate and which consequently impairs stripping of the scandium with water. Run No. 3, for instance, accomplished a scandium removal of 99 percent after three stripping steps while only 97 percent were removed after six stripping steps in run No. 1. Thus, the scrubbing with magnesium nitrate not only accomplishes a scandium product of higher purity, but it also facilitates back-extraction of the scandium into water.

Scandium oxide in pure form, as it is obtained by the process of this invention, is used as a standard for spectroscopic analysis of the chemical elements. Another application is for stabilizing the crystal structure of zirconium oxide, an addition of approximately 10 percent of scandium oxide arresting the cubic crystal phase of zirconium oxide and making it dimensionally stable; this is disclosed in the article "Beitraege zur Keramik hochfeuerfester Stoffe, I. Die Formen des Zirkondioxyds," by Otto Ruff and Fritz Ebert, published in Zeitschrift fuer Anorganische und Allgemeine Chemie 180, 19 (1929). Zirconium oxide is used for crucibles to be used for metallurgical processing of uranium; the absence of iron in these crucibles is particularly important, because the uranium would otherwise become contaminated by the iron.

It will be understood that this invention is not to be limited to the details given herein but that it may be modified within the scope of the appended claims.

What is claimed is:

1. A process of separating scandium values from trivalent iron values by contact of an aqueous nitric acid medium with a substantially water-immiscible alkyl phosphate medium, one of said media containing said scandium values and said iron values, consisting of adding magnesium nitrate to said aqueous medium in an amount to obtain a concentration of at least 2.5 lbs./gal., contacting said aqueous medium with said alkyl phosphate medium whereby the iron values are taken up by an aqueous phase while the scandium values are held by an alkyl phosphate phase, and separating said aqueous phase from said alkyl phosphate phase.

2. The process of claim 1 in which the alkyl phosphate is tributyl phosphate and the aqueous medium is saturated with magnesium nitrate.

3. A process of separating scandium values from trivalent iron values contained together in an aqueous solution, consisting of acidifying said aqueous solution with nitric acid to obtain a concentration of between 0.5 and 2 M, contacting said aqueous solution with tributyl phosphate whereby said iron values and said scandium values are taken up by the tributyl phosphate, contacting the tributyl phosphate solution formed with an aqueous solution of magnesium nitrate in a concentration of at least 2.5 lbs./gal. whereby the iron values are selectively back-extracted into said magnesium nitrate solution, separating the magnesium nitrate solution from the tributyl phosphate solution, and contacting said tributyl phosphate solution with water whereby the scandium values are back-extracted.

4. The process of claim 3 wherein the nitric acid concentration is about 1 M and the magnesium nitrate solution is saturated.

References Cited in the file of this patent

UNITED STATES PATENTS

| | | |
|---|---|---|
| 2,523,892 | Warf | Sept. 26, 1950 |
| 2,789,878 | Peppard | Apr. 23, 1957 |
| 2,796,320 | Spedding | June 18, 1957 |
| 2,824,783 | Peppard | Feb. 25, 1958 |

OTHER REFERENCES

"Chem. and Eng. News," vol. 28, page 1476, May 1, 1950.

Peppard et al.: "J. Phys. Chem.," vol. 57, pages 294–301, 1953.

Grinstead et al.: "Proceedings of the International Conference on the Peaceful Uses of Atomic Energy," vol. 8, pages 71–76, August 8–20, 1955.